Dec. 28, 1937. P. A. TANNER 2,103,564
INTERNAL COMBUSTION ENGINE
Filed Dec. 19, 1934
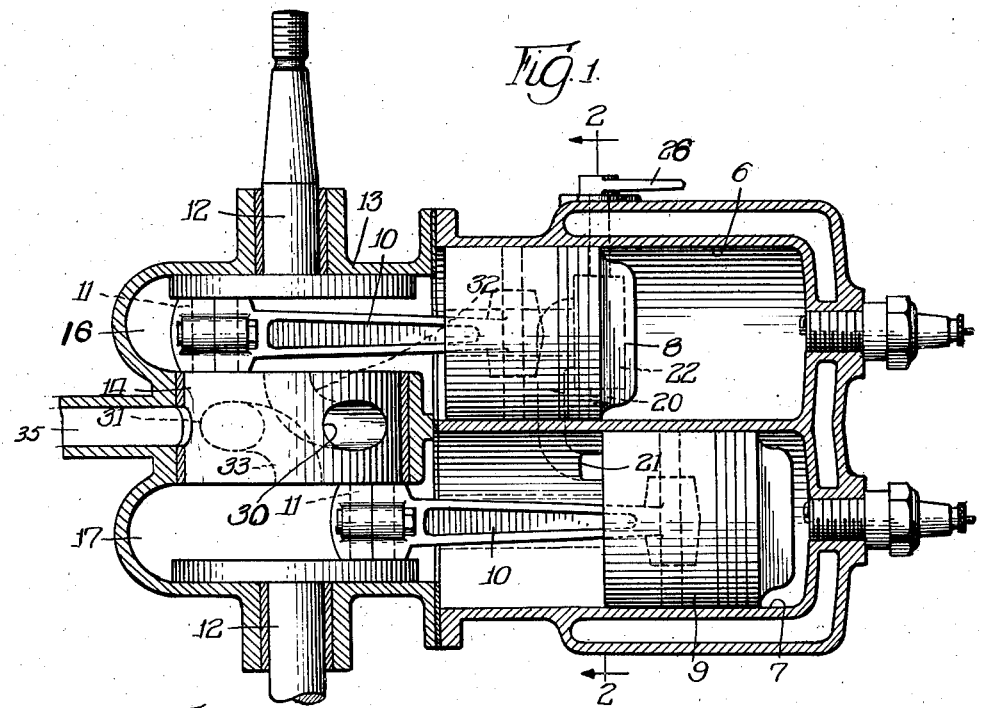
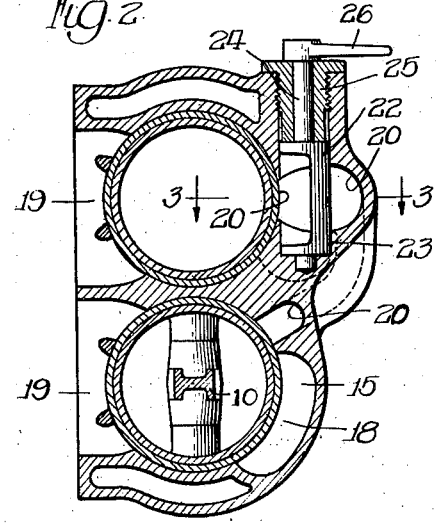
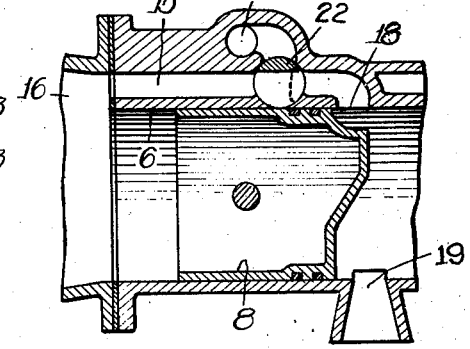
Inventor:
Philip A. Tanner;
By Kent W. Wonnell
Atty.

Patented Dec. 28, 1937

2,103,564

UNITED STATES PATENT OFFICE 2,103,564

INTERNAL COMBUSTION ENGINE

Philip A. Tanner, Waukegan, Ill., assignor to Johnson Motor Company, Waukegan, Ill., a corporation of Delaware Application December 19, 1934, Serial No. 758,176

9 Claims. (Cl. 123—73)

This invention relates in general to a combustion engine and has more particular reference to a multi-cylinder, two-cycle engine of the alternate firing type in which provision is made for bypassing the fuel from one cylinder to the other one, to improve slow speed running and starting conditions.

An important object of the invention is in the provision of valve operated means for controlling a bypass from one cylinder of a pair of engine cylinders to the other to divert a compressed mixture for one of the cylinders to the other cylinder which will cause the said other cylinder to receive more than its usual fuel mixture so that it will be more fully scavenged and result in more perfect combustion.

A further object of the invention is in the provision of a fuel bypass for an alternate firing engine to enable the elimination of the firing in one of the cylinders and to enable the engine to run more slowly and surely upon the other cylinder alone.

A further object of the invention is in the provision of improved control means for starting and running an alternate firing two-cycle engine by providing a fuel bypass connecting the cylinders.

A still further object of the invention is in the provision of means to fully scavenge the cylinder to which the fuel is bypassed, to enable the engine to run slowly and surely at slow speed.

In the accompanying drawing illustrating a preferred embodiment of the invention for accomplishing the foregoing and other results, Fig. 1 is a longitudinal sectional view of a two-cycle alternate firing internal combustion engine having a closed crank case with separate compartments for the different cylinders;

Fig. 2 is a section taken on the line 2—2 of Fig. 1; and

Fig. 3 is a detail section taken on the line 3—3 of Fig. 2.

Internal combustion engines of the two-cycle internal combustion type are commonly used in connection with outboard motors and because they are intended for high speed operation it is sometimes difficult to run them slowly and surely for slow speed purposes such as fishing, trolling, and the like.

The present invention provides a means particularly applicable to the alternate firing type of engine in which pairs of cylinders are located adjacent and one above the other. A controlled fuel bypass is provided between the cylinders which is operative to prevent the combustion chamber of one of the cylinders from receiving a fuel mixture and at the same time to provide means for bypassing the fuel mixture from one cylinder to the other so that the latter will receive a larger charge which will more thoroughly scavenge that cylinder which receives the fuel mixture, resulting in better combustion and more dependable operation, but operating at slower speed because of the decreased power and the retarding friction and load of the cylinder which is receiving no combustible mixture.

Referring now more particularly to the drawing, a sectional view of a two-cycle alternate firing engine is shown in Fig. 1 having upper and lower cylinders 6 and 7 in which pistons 8 and 9 are movable, the pistons being connected by rods 10 to crank pins 11 of a crank shaft 12 which is rotatably mounted in a crank case 13. As a part of the crank shaft there is a central bearing portion 14 which forms a partition between crank case chambers 16 and 17 for receiving a gaseous mixture and compressing it therein due to the movement of the piston 8 or 9 in the respective cylinder 6 or 7 with which the crank case chambers 16 and 17 are connected.

Communication is afforded between each of the crank case chambers and its respective cylinder around the piston, in normal operation, by means of a fuel passage 15 and a fuel inlet port 18 in the side wall of the cylinder, the exhaust gases being discharged from the cylinder through an exhaust passage 19 at the opposite side of the cylinder, all in accordance with well-known 2-cycle engine practice. To an engine of this type in which the pistons in adjoining cylinders are connected for alternate firing, that is, at 180 degrees apart on the crank shaft, the present invention is applied. It consists in the provision of a passage or a bypass 20 formed in the walls between the cylinders and extending from the fuel passage 15 of the upper cylinder and terminating in a port 21 in the other or lower cylinder which is uncovered by the piston 9 therein at the outer end of its stroke.

In order to control the closing of the inlet port 18 for the upper cylinder and the bypass, a valve 22 is rotatably mounted in a recess 23 provided in the wall of the upper cylinder at the end of the bypass 20 and adapted to close the bypass as shown in full lines in Fig. 3 or to close the passage 15 when the valve is turned at ninety degrees as shown by the broken outline in this figure. This valve 22 has a stem 24 extending through a packing gland 25 which holds the valve in place and at the outer end of the stem is an operating crank 26 by means of which the valve may be turned or adjusted as desired.

With the cut-out valve closed the engine will operate normally with both cylinders but with the cut-out valve open, that is, to close the ported end of the passage 15 of the upper cylinder, the bypass will be opened between the cylinders which will cause the compressed gases from the upper crank case chamber 16 to flow through the bypass 20 to the suction side of the piston in the lower cylinder. When the lower piston has just completed its suction stroke the upper crank case chamber is full of a compressed charge, the lower crank chamber has drawn in a charge of gas at relatively low pressure, and the uncovering of the port 21 will cause an additional charge of compressed gas to flow from the upper crank case chamber to the suction side of the lower piston, thus filling the lower crank case chamber fuller than usual with a combustible charge at higher pressure so that when compressed by the movement of the lower piston 9 this explosive mixture will bypass around the piston with enough volume to fully scavenge this cylinder, to fill the combustion chamber under higher pressure which will fully scavenge the combustion chamber and will cause good clean combustion when the charge is ignited.

In an engine of this type the crank case chambers 16 and 17 may be separately charged with an explosive mixture from a carbureter in any well known manner, but as illustrated, the partition bearing 14 forms a rotary valve with peripheral inlet ports 30 and 31 with passages 32 and 33 respectively leading therefrom through opposite sides of the portion into the chambers 16 and 17. A fuel inlet 35 through the casing 13 communicates alternately with the ports 30 and 31 for charging the chambers as the bearing valve member 14 is rotated.

With this construction the engine will run on the lower cylinder only, it will run more smoothly at lower speed, it will start easier and the engine may be run more slowly for trolling or fishing, the engine being also retarded by the idle movement of the upper piston in the cylinder, the upper combustion chamber being closed by the valve 21, thereby causing an obstructive drag upon the piston 8 in both directions of its movement. The lower cylinder is given a larger charge and under higher compression than during its normal operation which will assist in starting an engine of this type, in scavenging the lower cylinder of its exhaust gases, and in more fully charging it with a combustible mixture, thereby resulting in improved operation for that cylinder adapting the engine more readily for low speed operation.

I claim:

1. A two-cycle internal combustion engine having adjacent cylinders with separate closed pre-compression fuel chambers and a separate fuel passage therefrom for each cylinder, of a bypass between the fuel passages for transferring the compressed charge from one cylinder to the other at the end of the compression stroke to increase the charge in the latter, the bypass having a manually controlled valve for opening the bypass and closing the fuel inlet to one cylinder and for closing the bypass and opening the fuel inlet to the cylinder.

2. An internal combustion engine of the two-cycle, double-cylinder, alternate firing type comprising separate pre-compression chambers and passages therefrom to each of the respective cylinders, a piston movable in each cylinder for controlling the passages, and a bypass between the passages with a valve therein for closing the passage to one of the cylinders and opening the passage from this cylinder to the other cylinder to give the said other cylinder a larger charge than normal.

3. In a two-cycle, two cylinder, alternate firing, internal combustion engine of the crank case compression fuel type having means dividing the crank case and separate compression chambers for each cylinder, a passage from each compression chamber to the outer end of the cylinder, opposite inlet and exhaust passages in the walls of the cylinder, the passages being controlled by the pistons movable therein, of a transfer bypass between the passages having a port in the wall of one of the cylinders for admitting gas under compression from the passage of the other cylinder in advance of and after the normal fuel admission port for the cylinder to correspondingly increase the charging thereof.

4. A two-cycle internal combustion engine having adjacent cylinders with separate closed pre-compression fuel chambers and a separate fuel passage therefrom for each cylinder, of a bypass between the fuel passages for transferring the compressed charge from one compression cylinder to the other at the end of the compression stroke to increase the charge in the latter, the valve in the bypass being manually operable for closing the fuel passage from one chamber to its cylinder and adding the charge therefrom to the other chamber, the cylinder thus cut out causing an obstructive retardation to the engine.

5. In an internal combustion engine, the combination with pistons, connecting rods, and a crank shaft having cranks with which said connecting rods are engaged for consecutive expansion strokes, of charge compressing and expansion systems individual to the respective pistons, each such system including compression and expansion chambers and an intervening passage, a bypass connecting the said systems, and valve means operable for permanently diverting each successive compressed charge from its normal cycle in one of said systems through said by-pass into the other.

6. A two-cycle internal combustion engine comprising the combination with pistons, connecting rods, and a crank shaft having cranks to which said connecting rods are secured for the consecutive movement of said pistons in their compression and expansion strokes, of charge compression and expansion systems individual to the respective pistons, and each comprising a charge compression chamber, a transfer passage and a combustion chamber, said pistons being operable in the respective chambers of their respective systems to draw a charge into the compression chamber, compress it therein, and respond to the expansion of the charge in the combustion chamber in accordance with the two stroke cycle principle of operation, a by-pass from the said system of one piston to the said system of the other, and valve means concurrently controlling transfer to the combustion chamber of the first system and communication through said by-pass, said valve means being adapted to cut off transfer when opening such communication whereby to divert a charge from the first mentioned system to the second mentioned system to augment the charge in the second system, the valve means being adapted in another position to close said by-pass while opening the transfer passage to permit the normal cyclic operations of both of said systems.

7. In an internal combustion engine, the combination with pistons, connecting rods therefor, and a common crank shaft having cranks to which said connecting rods are secured for separate operation; of charge handling systems individual to the respective pistons and each including a precompression chamber, a combustion chamber having an exhaust port, and a transfer passage affording controlled communication between said chambers; and a by-pass duct connecting a portion of one of said systems with a portion of the other of said systems, the first of said systems having valve means adjustable between two positions in the first of which said by-pass duct is closed and each of said systems is open for normal two cycle operation and in the second of which positions said by-pass duct is open and one of said systems is precluded from normal two cycle operation and a charge compressed therein is diverted to the other of said systems.

8. In an internal combustion engine, the combination with pistons, connecting rods, and a crank shaft having cranks with which said connecting rods are engaged for consecutive expansion strokes, of charge compressing and expansion systems individual to the respective pistons, each such system including compression and expansion chambers served by a common piston and the intervening passage affording communication between said chambers under control of said piston, a by-pass connecting the said systems, and valve means operable for diverting a compressed charge from its normal cycle in one of said systems through said by-pass to augment a succeeding charge in the other.

9. In an internal combustion engine, the combination with pistons, connecting rods, and a crank shaft having cranks with which said connecting rods are engaged for consecutive expansion strokes, of a cylinder and a crank case means providing compressing and expansion systems individual to the respective pistons, each such system including compression and expansion chambers and an intervening passage communicating with the expansion chamber subject to the control of the piston operating therein, a by-pass connecting the said systems, and valve means co-operating with the piston of one of said systems for permanently diverting to said one system each successive charge compressed in the other of said systems from its normal cycle therein through the by-pass into said one system.

PHILIP A. TANNER.